United States Patent [19]

Mion

[11] Patent Number: 4,500,372
[45] Date of Patent: Feb. 19, 1985

[54] METHOD AND APPARATUS FOR CUTTING WOVEN LABELS

[75] Inventor: Sergio Mion, Padua, Italy

[73] Assignee: A. Mion S.p.A. Nastrificio, Padua, Italy

[21] Appl. No.: 380,068

[22] Filed: May 20, 1982

[30] Foreign Application Priority Data

Dec. 10, 1981 [IT]  Italy .............................. 41703 A/81

[51] Int. Cl.³ ...................... B29C 27/08; B32B 31/18
[52] U.S. Cl. .................................... 156/73.3; 83/16;
83/29; 83/55; 156/73.2; 156/88; 156/251;
156/580.2; 264/23
[58] Field of Search ....................... 156/88, 73.3, 73.1,
156/580.1, 580.2, 73.2, 251, 515, 513; 264/23;
83/16, 29, 55, 86, 167

[56] References Cited

U.S. PATENT DOCUMENTS

| | | | |
|---|---|---|---|
| 2,260,899 | 10/1941 | Heftler | 83/29 |
| 3,392,077 | 7/1968 | Brieske et al. | 156/513 |
| 3,404,057 | 10/1968 | Heiart | 156/555 |
| 3,416,398 | 12/1968 | Bodine, Jr. | 83/523 |
| 3,562,041 | 2/1971 | Robertson | 156/73.3 |
| 3,939,033 | 2/1976 | Grgach et al. | 156/515 |
| 4,069,727 | 1/1978 | Sparks et al. | 156/88 |
| 4,157,719 | 6/1979 | DeWoskin | 156/73.3 |
| 4,161,420 | 7/1979 | Clarke et al. | 156/73.3 |
| 4,310,978 | 1/1982 | Stern | 156/73.3 |
| 4,449,434 | 5/1984 | Johnson | 83/16 |

FOREIGN PATENT DOCUMENTS

| | | |
|---|---|---|
| 360956 | 2/1978 | Austria . |
| 15600067 | 10/1965 | Fed. Rep. of Germany . |
| 1809324 | 11/1968 | Fed. Rep. of Germany . |
| 2535897 | 8/1975 | Fed. Rep. of Germany . |
| 2159018 | 10/1972 | France . |

OTHER PUBLICATIONS

Textilpraxis International "Ultraschall-Schneidgerat fur Synthetics", Feb. 1970, Konradin-Verlag, Leinfelden-Echterdigen, BRD p. 190.

Primary Examiner—Michael Wityshyn
Attorney, Agent, or Firm—Fleit, Jacobson, Cohn & Price

[57] ABSTRACT

A method and an apparatus for cutting woven labels. According to the invention, the woven labels, in the form of a continuous ribbon or the like, are fed step by step towards an ultrasonic wave cutting device, where each label is centered and pressed between a first cutting element defining the outline of the label and a second cutting element, aligned with the first, constituting an ultrasonic wave emitter; an ultrasonic impulse of adequate frequency and intensity, causes the cutting and simultaneous cold welding of the label all around the edges.

2 Claims, 7 Drawing Figures

METHOD AND APPARATUS FOR CUTTING WOVEN LABELS

BACKGROUND OF THE INVENTION

This invention concerns a method and an apparatus for cutting woven labels in particular labels woven from synthetic yarn or such as to enable the cutting and cold welding of the edges by ultrasonic wave systems. There are known woven labels, obtained in particular with looms or jacquard looms, which are woven in ribbons of various widths, or in a continuous sequence of labels which must then be cut into the desired shape. Such labels generally present relatively simple geometric shapes, insofar as cutting by means of conventional systems proves to be laborious and somewhat difficult to carry out around complicated outlines or for small-sized labels. Furthermore, after cutting the label, the latter must be appropriately finished around the edges, for example, by hemming or by applying a seam carried out partially by hand in order to prevent the label from fraying. These label finishing operations therefore call for additional operations which involve both a considerable waste of time and higher costs.

The use of hot cutting systems by means of which it is possible to fix the edges of the label in order to prevent them from fraying, is also well-known; however, it is difficult, with hot-cutting systems, to cut labels with intricate or irregular shapes; moreover, the hot-cutting operation carried out on labels made from synthetic or similar fibres, involves the forming of a hard crust along the cut edges. It is therefore impossible to use such labels on garments of a certain value, applied on the outside of the garment itself.

The scope of this invention is to provide a method and an apparatus for remedying the abovementioned problems, and such as to make it possible to cut fabric labels with perfect edges, without fraying or hardened borders, as occurs with conventional systems.

A further scope of this invention is to provide a method and an apparatus, as defined above, by means of which it is possible to carry out the cutting and cold welding of the label at the same time as the shaping of the edges of the label itself.

A further scope of this invention is to provide fabric labels combined with backing material; such backing material being preferably attached to the label during the cutting operation itself, and secured around the edges by the ultrasonic cold welding.

The method according to the invention, for cutting labels, starting from labels woven in the form of a ribbon or continuous sequence of labels, comprises feeding the sequence of labels step by step, and guiding them towards an ultrasonic wave cutting device, holding each label centred between a first cutting element constituting an ultrasonic wave emitter and, respectively, a second cutting element defining the outline of the label, pressing the label between the aforesaid cutting elements, and emitting an ultrasonic impulse, thereby causing the cutting of the label around the edges.

In particular, the second cutting element consists of a punch defining the outline of the label to be cut, and is held by a tubular supporting element into which the cut labels fall and collect.

According to an alternative of the method of this invention, the ribbon or sequence of labels, may be fed together with a backing material, placed to the rear of the labels, which is welded or joined at the edges of the label itself during the ultrasonic cutting operation; it is thus possible with a single operation, to adequately protect the weft threads appearing at the rear of the label.

The invention will be described in greater detail hereunder, with reference to the accompanying drawings, in which:

DESCRIPTION OF THE INVENTION

Figure 1:
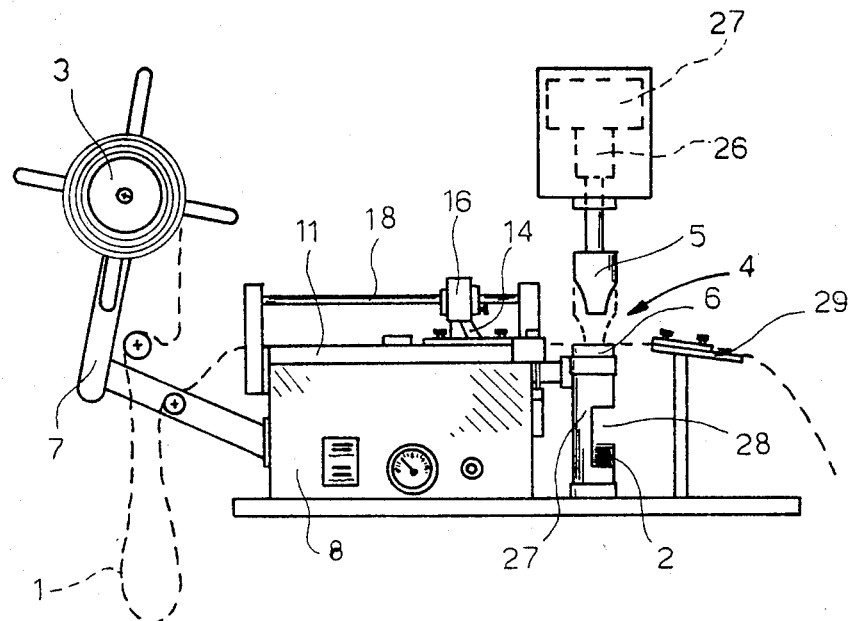
FIG. 1 shows a front view of an apparatus for cutting woven labels, according to the invention.
Figure 2:
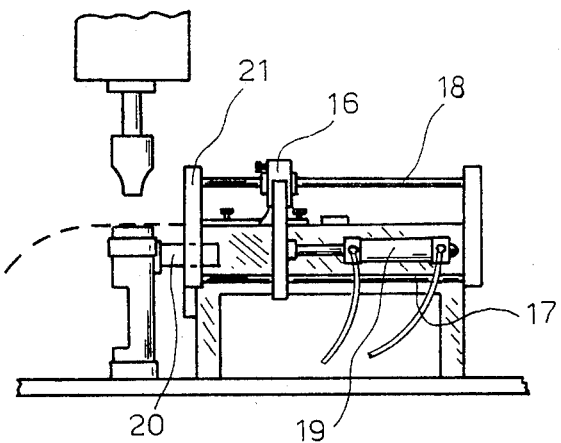
FIG. 2 shows a view, seen from the rear.
Figure 3:
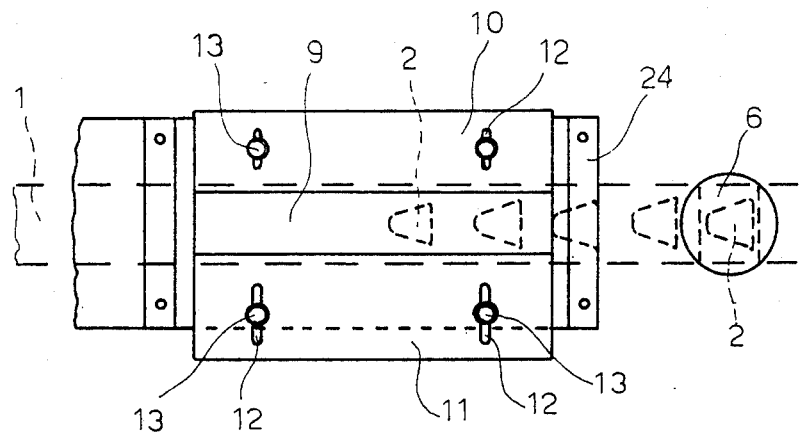
FIG. 3 shows a top view of a part of the apparatus.

As shown in the figures, and in particular in FIGS. 1 and 3, a ribbon 1 of woven labels 2, unwinds from a roll 3; the ribbon 1 of labels, is then guided and fed, step by step, towards an ultrasonic wave device 4. Each single label 2 to be cut, is stopped and centred between an upper cutting element 5, defining an emitter of ultrasonic waves of suitable amplitude and frequency and a lower cutting element 6 defining the outline of the label to be cut.

As soon as the label has been correctly positioned between the elements 5 and 6 of the cutting device, the label is retained with a certain pressure, for example by lowering the upper cutting element 5 down onto the lower cutting element 6; an ultrasonic wave impulse is then emitted which causes the cutting of the label around its outline and simultaneously welds the fabric around the cut edge, thus preventing fraying.

Figure 6:
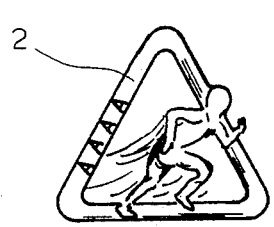
FIGS. 6 and 7 show, by way of example, two labels obtainable by the method and the apparatus according to the invention.
Figure 7:
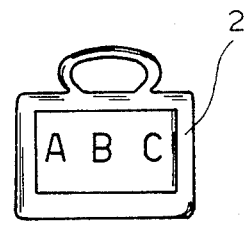

The cut label drops below, and the ribbon of labels is moved forward again, by one step, for the next label to be cut. The labels 2, as shown by way of example, in FIGS. 6 and 7, may present any outline, regular or irregular shape, even including protruding and/or recessed portions, corresponding to the shape of the cutting element 6. According to the invention, the shaped cutting and simultaneous welding of the fabric around the edges is achieved thanks to the use of an ultrasonic wave system, never ever till now used in the fabric label manufacturing sector. The label thus obtained, presents perfectly cut edges, free from fraying or hardened portions, thereby also making the label utilizable on valuable garments.

An embodiment of an apparatus for cutting labels by means of ultrasonic wave systems is shown in the FIGS. 1 to 4 of the accompanying drawings.

As mentioned previously, the ribbon 1 of labels, unwinds from a roll 3 held on an arm 7, and is guided and fed step by step towards the ultrasonic wave cutting device 4. Hence, the apparatus comprises a base 8 defining a sliding surface for the ribbon 1 of labels; fixed on either side of the surface are guiding plates 10 and 11, defining a sliding channel for the ribbon or sequence of labels 2 to be fed to the cutting device 4. The plates 10 and 11 present transversal slots 12 penetrated by bolts 13 provided with knobs; by loosening the bolts and shifting the guiding plates 10 and/or 11 sideways, it is possible to adjust the width of the feeding channel of the ribbon 1, adapting said width to that of the fabric or labels to be cut.

The step by step feeding of the ribbon 1 of labels in order to position and center each single label 2 correctly between the elements 5 and 6 of the cutting device, may be achieved by any suitable means; in the example shown, this step by step feeding device comprises a pushing member 14 (FIGS. 1 and 4) able to swing on a pivoting axis crosswise to the ribbon 1 of labels, and parallel to the sliding surface 9. The pushing member 14 is pivoted to a L-shaped supporting arm 16, which runs along two guides 17 and 18, parallel to the sliding surface 9 of the ribbon 1. The L-shaped supporting arm 16 is connected to the rod of a double-acting cylinder 19 (FIG. 2) which moves the label feeding device from a backward position, indicated by the continuous line in FIG. 1, to a forward position, indicated by the dotted line in the same figure, along a path equivalent or corresponding to the distance between the front edges of two adjacent labels of the ribbon.

Figure 4:
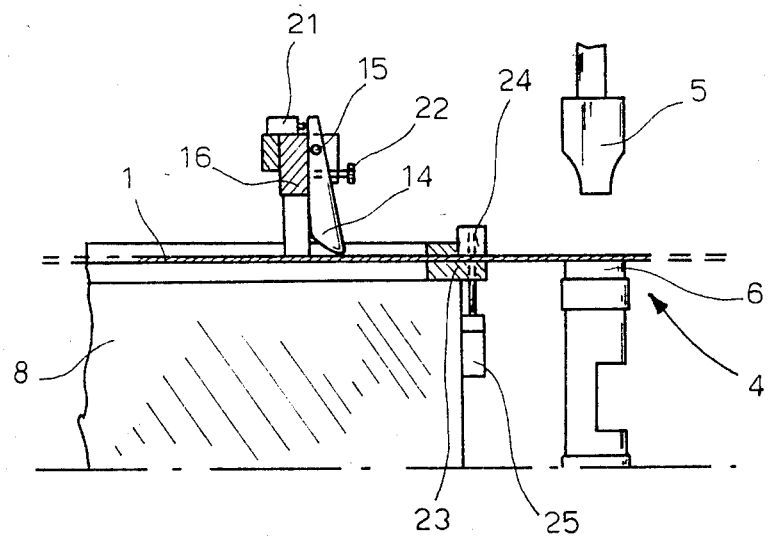
FIG. 4 shows a longitudinal sectional view, showing further features of the apparatus.

As the size and shape of the labels may vary from one ribbon to another, means are provided for adjusting the stroke of the arm 16 supporting the pushing emember 14; this device is in the form of a stop element 20, against which the arm 16, in its forward position, comes to stop; the stop element 20 is in the form of a cylindrical member which can be finely screwed into a plate or other part integral with the base 8 supporting the guides. As shown in FIG. 4, the pushing member 14 is controlled by a pneumatic cylinder 21 which acts in a point above the pivot 15, in order to make the lower end of the pusher 14 rotate downwards and against the ribbon of labels 1; in this way, the member 14 moves the ribbon 1 during its forward stroke.

During the return stroke, as the cylinder 21 is no longer actuated and the pusher 14 is free to swing in the opposite direction, its lower end simply slides over the ribbon of labels; in order to facilitate the return of the member 14, its lower end is perferably shaped, for example, rounded or sloping to the rear. A screw 22 placed at right-angles below the pivot 15, can be adjusted and made to protrude more or less from the rear of the pusher 14 defining a stop for adjusting its inclination and, therefore, the pressure exerted upon the ribbon 1.

The apparatus comprises moreover, a device for blocking the ribbon 1 in order to keep the labels 2 perfectly centred during the cutting operation. This blocking device is situated on the side of the base 8 facing the cutting device 4. The blocking device comprises a cross-piece 23 fixed to the base 8, on which the ribbon of labels 1 slides; a bar 24 can be moved vertically along guiding rods by means of a control cylinder 25 operated in coordination with the entire apparatus.

The apparatus comprises, moreover, an ultrasonic wave cutting device, indicated by reference 4, placed immediately after the step feeding device for the woven ribbon of labels. Such device, shown schematically, comprises an upper cutting element 5 held at the end of the rod of a control cylinder 26, which is operated in sequence with the cylinders 19 and 21 of the step feeding device and with the cylinder 25 of the blocking device, in order to move the upper cutting element 5 vertically, from a raised position, as shown, to a lowered position, against the lower cutting element 6.

The upper element 5 of the cutting device is made in the form of an ultrasonic wave emitter, and is connected, by means of the rod of the control cylinder 26, to an ultrasonic wave generator 27, per se known.

The lower cutting element 6 comprises a punch defining the outline of the label to be cut; the punch 6 is held on a tubular support 27 into which the labels 2 drop after being cut; the labels can then be removed through a lateral aperture 28 in the support 27. A guide 29 can be optionally placed downstream the cutting device 4, in order to guide the cut ribbon and in order to facilitate the centring of each single label under the cutting device.

Figure 5:
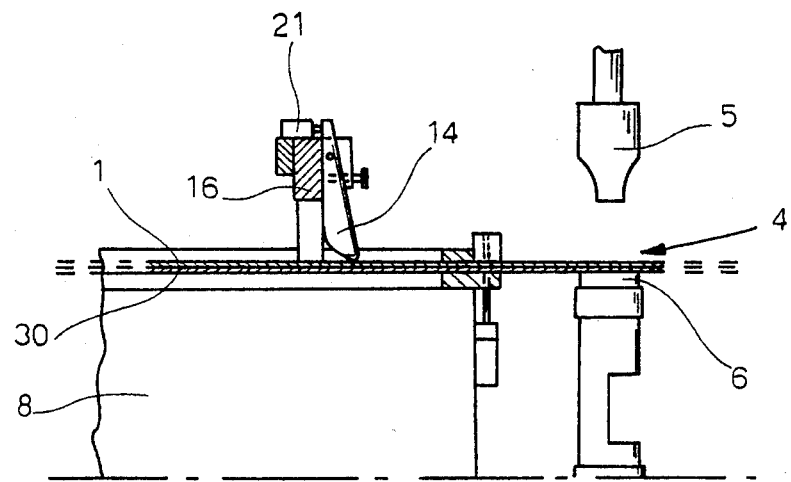
FIG. 5 is a view similar to that of the previous FIG. 4 showing an alternative of the method according to the invention.

FIG. 5 of the accompanying drawings shows a possible variation in the cutting method according to the invention. Sometimes woven labels call for the application of a suitable backing material, for example, in fabric, non-woven fabric, or other suitable material. According to a further feature of this invention, it is possible to feed a tape 30 of backing material, together with, and beneath the ribbon 1 of labels, making it advance step by step with the ribbon of labels itself. In this way it is possible to apply a backing on each label, during the cutting and welding operation, welding said backing material directly onto the edges of the label. The apparatus, according to the described method, operates as follows: initially, the cutting device 4 and the device 24 for blocking the ribbon 1, are open, and the arm 16 of the step by step feeding device is in the backward position; at this point, the cylinder 21 is operated, which rotates the pusher 14 onto the ribbon 1. The cylinder 19 is simultaneously operated, which moves the arm 16 forward, moving the ribbon of labels one step forward. The stopping of the arm 16 against the stop member 20 determines the correct positioning of a label 2 in the cutting device. At this point, the cylinder 25 of the blocking device is operated, followed by the cylinder 26 of the ultrasonic wave emitter which lowers the cutting element 5 onto the cutting element 6, holding the label 1 with a certain amount of pressure; in the meantime, the arm 16 of the step by step feeding device is made to return to its backward position. When the upper cutting element 5 has reached the end of its downward stroke, a sensing device or microswitch (not shown) operates the circuit of the ultrasonic wave generator 27 which sends out an impulse of pre-established duration and amplitude; the ultrasonic impulse is guided along the piston rod and the emitter 5, towards the label to be cut.

The action of the ultrasonic impulse consequently causes the cut of the label against the edges of the punch or lower cutting element 6, cutting the outline of the label. Simultaneously to the cutting of label, the ultrasonic impulse welds the fabric around the edges of the label without causing the material to melt or to form crusts or hardened parts in correspondence with the cut edge.

In the case in which the tape 30 of backing material is fed together with the ribbon of labels 1, the action of the ultrasonic waves also causes the cutting and welding of said backing material along the edges of the label. The label then drops into the tubular support 27 from where it will be removed through the lateral aperture 28. The emitter 5 is then raised and the ribbon 1 of labels is again made to move another step forward in order to cut the next label.

It is clear, from the aforegoing description and accompanying drawings, that the invention concerns a new method and a new apparatus for cutting woven labels, which make use of an ultrasonic wave cutting device which simultaneously cuts each single label and welds its edges, and, if required, cuts and welds a backing material. It is therefore understood that what has been described and shown by reference to the accompanying drawings, is given merely by way of example and in no way limits the invention as claimed.

What is claimed is:

1. A method for cutting woven labels from a ribbon of labels, said method comprising: feeding a ribbon of fabric labels woven from synthetic yarn to a cutting machine; guiding the labels to an ultrasonic wave cutting device; positioning each label between a first cutting element defining an ultrasonic wave emitter and, respectively, a second cutting element having a continuous closed cutting edge defining the outline of the label and having an opening within said closed cutting edge; pressing the label between the cutting elements and emitting an ultrasonic wave impulse, causing the simultaneous cutting of the label from the ribbon and the welding of the fabric around its cut edges; providing a tubular collector positioned below said second cutting element and in communication with said opening; and collecting said cut labels in said tubular collector.

2. A method as claimed in claim 1 comprising the additional steps of feeding a tape of backing material together with and adjacent to the ribbon of fabric labels to the cutting machine; guiding the tape of backing material with the adjacent label ribbon to the ultrasonic wave cutting device; pressing the label and adjacent backing material between the cutting elements to cause the simultaneous cutting and welding of the label and the adjacent backing material around their respective cut edges.

* * * * *